(12) United States Patent
Thomas

(10) Patent No.: US 6,339,918 B1
(45) Date of Patent: Jan. 22, 2002

(54) LAWN MOWER HEIGHT ADJUSTMENT

(75) Inventor: Roger Thomas, Cleveland (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/334,317

(22) Filed: Jun. 16, 1999

(30) Foreign Application Priority Data

Jun. 16, 1998 (GB) .............................................. 9812935

(51) Int. Cl.[7] .............................................. A01D 34/74
(52) U.S. Cl. ........................... 56/17.2; 56/16.7; 56/322
(58) Field of Search ................................. 56/16.7, 17.1, 56/17.2, 201, 322; 16/18 R, 32, 33, 34; 280/86, 89, 47.11, 79.11

(56) References Cited

U.S. PATENT DOCUMENTS

| | | | |
|---|---|---|---|
| 2,523,439 A | | 9/1950 | May |
| 2,568,822 A | * | 9/1951 | Pervis ........................ 56/17.2 |
| 2,848,859 A | * | 8/1958 | Abel ........................... 56/17.2 |
| 2,857,725 A | | 10/1958 | Canfield |
| 2,948,544 A | | 8/1960 | Rowe et al. |
| 3,382,653 A | | 5/1968 | De Buigne |
| 3,845,933 A | * | 11/1974 | Heizer, Jr. ............... 280/79.11 |
| 4,167,093 A | * | 9/1979 | Pfeiffer et al. ............... 56/17.2 |
| 4,321,784 A | | 3/1982 | Wood et al. |
| 4,368,806 A | | 1/1983 | Raineri |
| 4,835,952 A | | 6/1989 | McLane |
| 4,870,811 A | | 10/1989 | Steele |
| 5,020,310 A | | 6/1991 | Oshima et al. |
| 5,210,998 A | | 5/1993 | Hojo et al. |
| 5,269,125 A | | 12/1993 | Langley, Sr. et al. |
| 5,297,379 A | | 3/1994 | Smith |
| 5,355,664 A | | 10/1994 | Zenner |
| 5,398,489 A | * | 3/1995 | Oshima ....................... 56/17.2 |
| 5,463,855 A | | 11/1995 | Johnson et al. |
| 5,526,633 A | * | 6/1996 | Strong et al. ................. 56/17.2 |
| 5,653,096 A | | 8/1997 | Edwards |
| 5,876,173 A | * | 3/1999 | English, Jr. ............... 280/79.11 |
| 5,957,649 A | * | 9/1999 | English, Jr. et al. ..... 280/79.11 |

FOREIGN PATENT DOCUMENTS

| | | |
|---|---|---|
| AU | 2487497 | 12/1997 |
| DE | 3136203 | 9/1981 |
| DE | 295 08 100 U | 5/1995 |
| DE | 297 12 138 U | 7/1997 |
| EP | 0111725 | 11/1983 |
| EP | 0367891 | 2/1989 |
| EP | 0625434 | 5/1994 |
| EP | 0714648 | 6/1996 |
| FR | 2252802 | 11/1973 |
| GB | 878834 | 10/1961 |
| GB | 919689 | 2/1963 |
| GB | 1141011 | 1/1969 |

(List continued on next page.)

*Primary Examiner*—Robert E. Pezzuto
*Assistant Examiner*—Nathan Mammen
(74) *Attorney, Agent, or Firm*—Harness, Dickey & Pierce P.L.C.

(57) ABSTRACT

A lawn mower comprises a cutting deck 2 mounted on at least first and second wheel assemblies. The first and second wheel assemblies comprise, respectively, first and second height adjustment mechanisms 22. The first height adjustment mechanism 22 comprises a first pivoting mechanism 22 pivotal about a first axis for adjustment of the height of the deck above the first wheel assembly. The second height adjustment 22 mechanism comprises a second pivoting mechanism 22 pivotal about a second axis, parallel to the first axis, for adjustment of the height of the deck above the second wheel assembly. A connection or bar 38 is formed between the first and second pivoting mechanisms for pivoting the first and second pivoting mechanisms in opposite directions about the first and second axis, respectively. Each of the pivoting mechanisms 22 raise the height of the deck 2 by substantially equal mounts when pivoted through any part of their full range of pivotal movement.

10 Claims, 7 Drawing Sheets

FOREIGN PATENT DOCUMENTS

| | | |
|---|---|---|
| GB | 1199310 | 7/1970 |
| GB | 1363341 | 8/1974 |
| GB | 1597925 | 9/1981 |
| GB | 2221373 | 2/1990 |
| GB | 2293095 | 3/1996 |
| GB | 2327916 | 2/1999 |
| WO | 9609752 | 4/1996 |
| WO | 9628011 | 9/1996 |

* cited by examiner

LAWN MOWER HEIGHT ADJUSTMENT

BACKGROUND OF THE INVENTION

The present invention relates to lawn mowers and more particularly to height adjustment mechanisms for such mowers.

Household lawn mowers comprise a cutting deck upon which is mounted a motor. The motor can be either an electric motor powered by either a main electricity supply or a battery or an internal combustion engine. The motor rotatingly drives a cutting blade mounted below the cutting deck about a substantially vertical axis. The cutting blade cuts the grass beneath the deck as it rotates. The cutting deck is commonly mounted on wheels or rollers. The wheels can either have a fixed direction of travel so that the lawn mower moves over the lawn in a forward and reverse direction, or can be castor wheels which are able to freely swivel so that the mower can travel over the lawn in any direction of travel.

It is desirable to have the height of the cutting blade adjustable in relation to the surface of the lawn. This allows the grass to be cut to differing heights. One common way of achieving this is by having the cutting deck of the lawn mower mounted on the wheels or rollers in such a manner that the height of the deck, and hence the height of the cutting blade, is adjustable relative to the wheels.

Such mechanisms include mounting the axles of the wheels or rollers on the ends of levers which are pivotally mounted onto the deck and which are capable of being releasably locked into a plurality of angular positions. The height of the cutting deck in relation to the wheels or rollers is dependent upon the angle of pivot of the levers. Interconnecting bars can be added between the levers to ensure that the levers pivot in unison so that the height adjustment of the wheels is uniform.

In one type of mower, the forward and rear axles are mounted on the end levers which are pivotally mounted on the cutting deck which are parallel and are interconnected by a bar so that they pivot in unison. However, the forward rear axles pivot about their axes in the same direction. U.S. Pat. No. 4,835,952 shows a mower having a typical design of height adjusting mechanism. In U.S. Pat. No. 4,835,952 the front axle is mounted on to arms of two bell cams which are pivotally mounted onto the body of the mower at their apexes. The second arm of the bell cams project in a generally upward direction. The rear axle is mounted in a similar fashion. Two interconnecting bars interconnect between the second arms of the front and rear bell cams. As the front bell cams pivot, the rear bell cams also pivot in the same direction thus lowering or highering the body of the mower uniformly.

However, such designs are bulky taking up valuable space on the mower because it is necessary for the interconnecting bars to project beyond the wheels. In addition, the length of the interconnecting bars has to be approximately the same as the distance between the front and rear wheels if the rate which the height of the deck rises above each wheel is to be constant.

SUMMARY OF THE INVENTION

According to the present invention, a lawn mower comprises a cutting deck mounted on at least first and second wheel assemblies. The first and second wheel assemblies comprise, respectively, first and second height adjustment mechanisms. The first height adjustment mechanism comprises a first pivoting mechanism pivotal about a first axis for adjustment of the height of the deck above the first wheel assembly. The second height adjustment mechanism comprises a second pivoting mechanism pivotal about a second axis, parallel to the first axis, for adjustment of the height of the deck above the second wheel assembly. A connection is formed between the first and second pivoting mechanisms for pivoting the first and second pivoting mechanisms in opposite directions about the first and second axis, respectively. By constructing the height adjustment mechanisms in this fashion, it can provide a compact construction. It can also enable the height adjustment mechanism to be located between the wheel assemblies thus reducing the amount of mechanical linkage required.

Preferably, each of the pivoting mechanisms raise the height of the deck by substantially equal amounts when pivoted through any part of their full range of pivotal movement.

Preferably, the first pivoting mechanism is pivotally connected at a first point away from its ("first") pivot axis to an end of an interconnecting bar. The second pivoting mechanism is pivotally connected at a second point away from its ("second") pivot axis to the other end of the interconnecting bar. This can provide a simple and reliable construction.

The length of the interconnecting bar can be less than the distance between the axes of pivot of the pivoting mechanisms. This provides the advantage that the points of articulation at the ends of any interconnecting bar joining the pivoting mechanisms can lie between the pivoting mechanisms while allowing substantially equal vertical movement of the different height adjustment mechanisms.

Preferably, the first point connection of the bar to the first pivoting mechanism is spaced from the first axis in a first direction parallel to a plane extending though the first and second axes. And the second point connection of the bar to the second pivoting mechanism is spaced from the second axis in a second direction opposite the first direction. This can enable the length of the interconnecting rod to be reduced so that it is less than the distance between the axes of pivot. In addition, the interconnecting bar does not have to project pass any of the wheel assemblies when moved through its full range of positions and thus avoids taking up valuable space.

Each pivoting mechanism can be pivotally connected to the interconnecting bar via a rod which is rigidly attached to the pivoting mechanism and which preferably projects perpendicularly away from the axis of pivot of the pivoting mechanism. In a direction perpendicular to the plane which passes through both axes of pivot of the pivoting mechanisms, the two rods ideally project in opposite directions to each other and preferably in a direction parallel to a plane which passes through both axes of pivot, towards each other.

Each pivoting mechanism can comprise at least one lever pivotally mounted on the cutting deck and connected with the wheel assembly. And ideally, the lever of each mechanism are configured to move as a mirror image of each other in the plane located equidistantly between the two axes of pivot of the levers. The levers can project from their axis of pivot in a direction parallel to a plane which passes through both axes of pivot away from each other. This can result in a very compact yet simple height adjustment mechanism. The whole of the interconnecting mechanism is located between the wheel assemblies throughout its fill range of movement.

BRIEF DESCRIPTION OF THE DRAWINGS

A lawn mower according to the present invention will now be described by way of example with reference to the following drawings of which.

DETAILED DESCRIPTION OF THE PREFERRED EMBODIMENT

Figure 1:
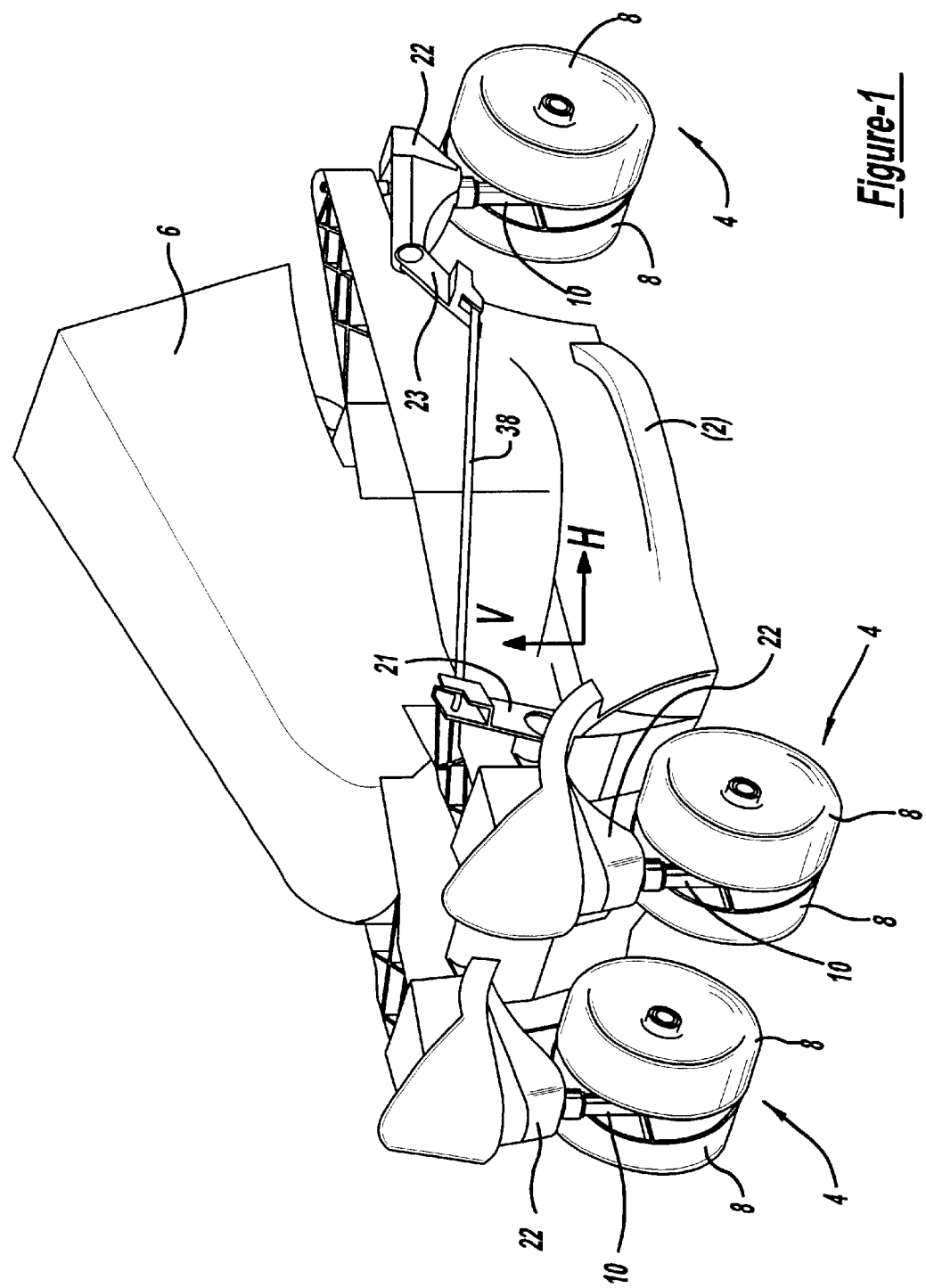
FIG. 1 shows the cutting deck of a lawn mower mounted on four castor wheels.

Referring to FIG. 1, the cutting deck 2 or frame of the lawn mower is mounted on four castor wheels 4 located near to the four corners of the deck 2, upon which is mounted an electric motor not shown and a hood not shown which encloses the motor. The motor rotatingly drives a cutting blade not shown mounted below the deck on the output drive spindle of the motor about a substantially vertical axis in known fashion. A grass chute 6 is mounted on top of the cutting deck 2 which directs the grass cuttings from the cutting blade to a grass box not shown which attaches to the rear of the cutting deck 2. A height adjustment mechanism is attached to the mower which raises or lowers the height of the cutting deck 2 in relation to the castor wheels 4, hence lifting or lowering the height of the cutting blade in relation to the ground below the mower.

Each of the four castor wheels 4 of the mower and its corresponding height adjustment mechanism are preferably constructed and operate in the same manner. Other variations will be apparent to those skilled in the art.

Figure 2:
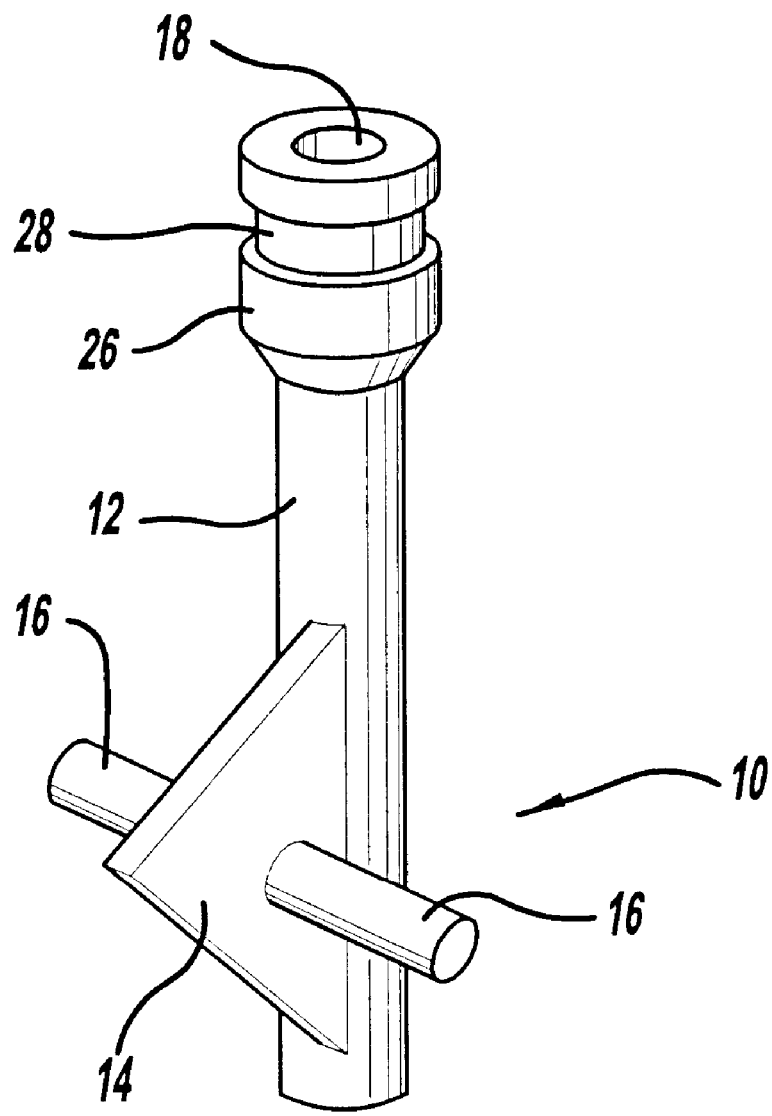
FIG. 2 shows the central mount of a castor wheel.

As can be seen in FIG. 1, each castor wheel 4 comprises two wheels 8 of equal dimensions which are mounted on a central mount 10 adjacent to each other and which have the same axis of rotation. FIG. 2 shows the central mount 10 which comprises a vertical sleeve 12, a vertical triangular flange 14 attached to the side of the base of the sleeve 12 and two shafts 16 of circular cross section which project perpendicularly from the sides of the triangular flange 14 in opposite directions. The sleeve 12 forms a bore 18 of circular cross section which is sealed at the base end. The two horizontal shafts 16 form axles upon which the two wheels 8 are mounted. The wheels 8 are retained upon the axles 16 by means of a clip not shown and are able to freely rotate about the axles 16. The central mount 10 is formed from a low friction plastic in a one piece construction.

Figure 4:
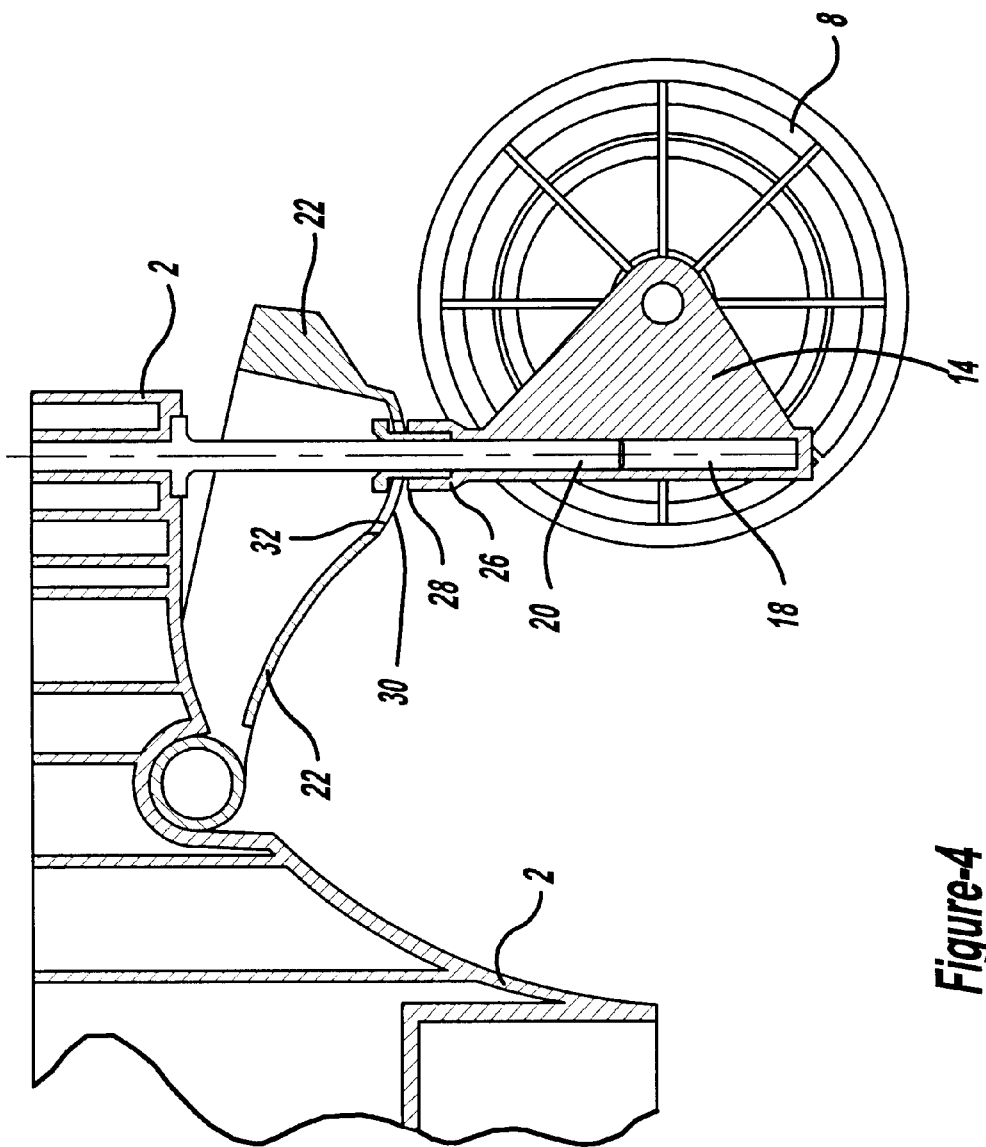
FIG. 4 shows a vertical section of the height adjustment mechanism, the cutting deck and the caster wheel when the height of the deck is at its maximum.
Figure 5:
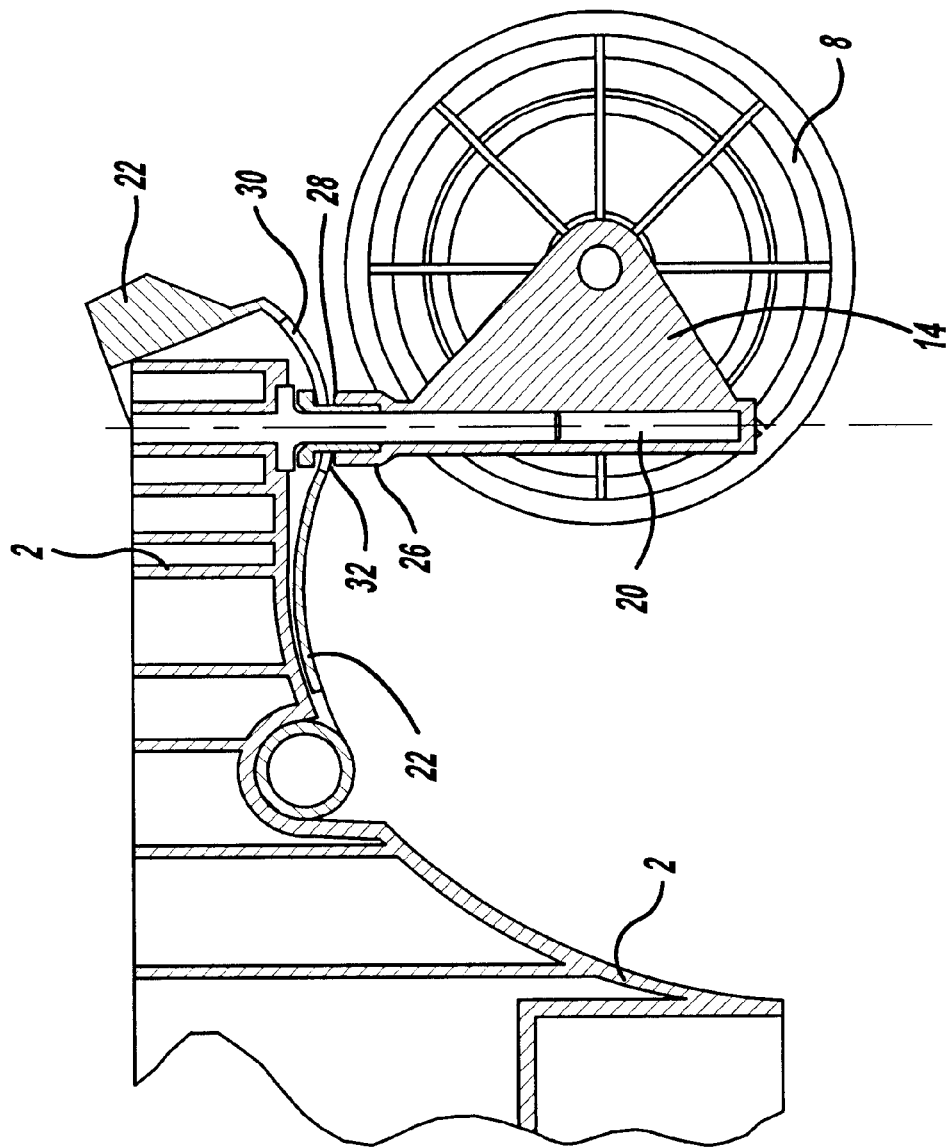
FIG. 5 shows a vertical cross section of the height adjustment mechanism, the cutting deck and the castor wheel when the height of the deck is at its minimum.

Each castor wheel 4 is mounted on a metal rod 20 which is rigidly attached to and projects vertically downwards from the underside of the cutting deck 2 as best shown in the cross sectional drawings shown at FIGS. 4 and 5. The metal rod 20 has a circular cross section having a diameter which is slightly less than that of the bore 18 of the central mount 10. The metal rod 20 is located within the bore 18 of the central mount 10, the central mount 10 being able to freely slide along and rotate about the metal rod 20.

Figure 3B:
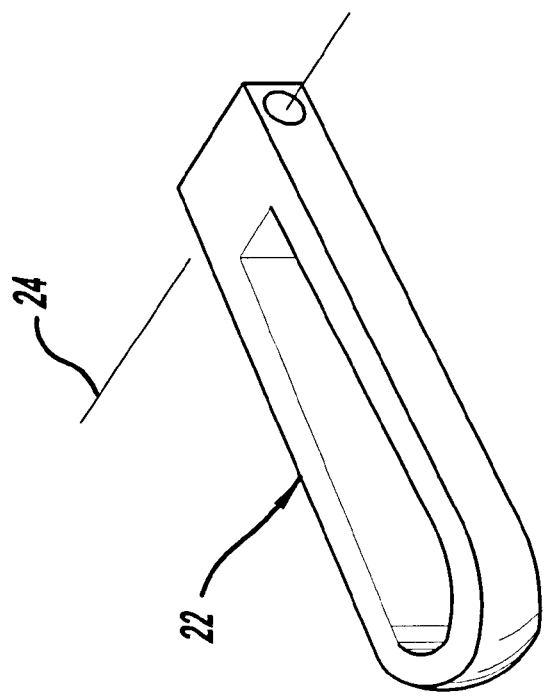
FIGS. 3A and 3B show the pivotal lever from above and in perspective respectively.
Figure 3A:
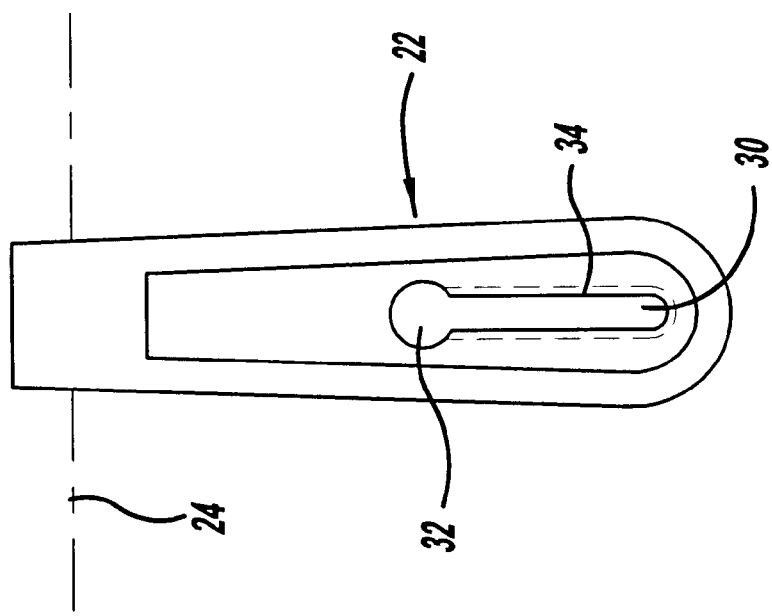

The height adjustment mechanism for each castor wheel 4 comprises a lever 22 which is pivotally mounted on the cutting deck 2 about an axis of pivot 24. FIGS. 3A and 3B show the pivotal lever 22. The lever is slidably attached to the sleeve 12 of the castor wheel 4 and acts as a cam, sliding the central mount 10 back and forth along the rod 20 as the lever 22 pivots in either direction, as shown in FIGS. 4 and 5.

A collar 26 is formed around the top of the sleeve 12 of each castor wheel 4 as best shown in FIG. 2. A groove 28 is formed around the outer periphery of the collar 26. The pivotal lever 22 is trough shaped as best shown in FIG. 3B. An elongate slot 30 is formed along the length of the lever 22 in the base of the trough. At one end of the elongate slot 30, towards the axis of pivot 24 of the lever 22, a large aperture 32 has been formed resulting in an overall key shaped slot. The diameter of the large aperture 32 in the lever 22 is greater than that of the outer circumference of the collar 26. The width of the elongate slot 30 is less than the diameter of the outer circumference of the collar 26 but less than the diameter of the circumference of the groove 28.

The sleeve 12 of the central mount 10 of the castor wheel 4 is attached to the lever 22 by passing the top end of the sleeve 12, having the entrance to the bore 18, through the large aperture 32 until the groove 28 formed around the collar 26 becomes aligned with the elongate slot 30 in the lever 22. The thickness of the lever 22 around the edge 34 of the elongate slot 30 is less than the width of the groove 28. The collar 26 is moved along the length of the lever 22, the edge 34 of the elongate slot 30 entering into and sliding through the groove 28. The sleeve 12 is, therefore, able to slide back and forth along the lever 22 within the elongate slot 30. The groove 28 acts as a cam follower, sliding along the edge 34 of the elongate slot 30 as the lever 22 pivots. However, the collar 26 is prevented from being moved perpendicularly to apart from the slight movement due to the thickness of the edge 34 of the elongate slot 30 being less than the width of the groove 28 or withdrawn from, and hence detached from the lever 22 whilst the collar 26 is located within the elongate slot 30.

When the lawn mower is fully assembled the metal rod 20 is located within the bore 18 formed by the sleeve 12 and the collar 26 is located within the elongate slot 30 in the lever 22, such that the edge 34 of the elongate slot 30 are located within the groove 28 around the collar 26 as best shown in FIGS. 4 and 5.

The height of deck 2 above the castor wheel 4 is at its maximum when the lever 22 is pivoted in downward position, as best shown in FIG. 4. In this position the collar 26 is located at the end of the elongate slot 30 furthest away from the large aperture 32 and the axis of pivot 24 of the lever 22. The rod 20 is of sufficient length that part of the rod 20 still remains within the bore 18 of the central mount 10 when the deck 2 is at its maximum height. Sufficient overlap is provided between the rod 22 and the bore 18 i.e. the amount of rod 20 still located within the sleeve 12 when the central mount 10 is extended away from the cutting deck 2 by its maximum amount to provide a strong and sturdy interconnection between the sleeve 12 and the metal rod 20, particularly when the forces are applied to the castor wheel perpendicularly to the vertical axis of swivel.

When the height of the cutting deck 2 above the castor 4 is to be reduced, the lever 22 is pivoted in an upward direction, as best shown in FIG. 5. This moves the sleeve 12 and hence the central mount 10 along the rod 20, a greater proportion of the length of the rod 20 being located within the bore 18 of the sleeve 12. As the central mount 10 moves along the rod 20, the groove 28 slides along the sides 34 of the elongate slot 30 in the lever 22.

When the height of the cutting deck 2 above the castor is at its minimum as best shown in FIG. 5, the whole of the metal rod 20 is located within the bore 18 of the central mount 10. In this position the collar 26 of the central mount 10 is located towards the end of the elongate slot 30 closest to the large aperture 32. The large aperture 32 is located in such a position that the collar 26 is unable to slide far enough along the elongate slot 30 in order to enter into the large aperture 34 from the elongate slot 30 while the castor wheel 4 is adjusted through its full range of height positions.

The height of deck 2 above the castor wheel 4 is fixed by locking the angular position of the lever 22.

Because the groove 28 is formed around the full circumference of the collar 26, the central mount 10 and hence the castor wheel 4 is able to freely rotate about the rod 20 whilst the collar 26 is located within the elongate slot 30 within the lever 22.

Figure 6:
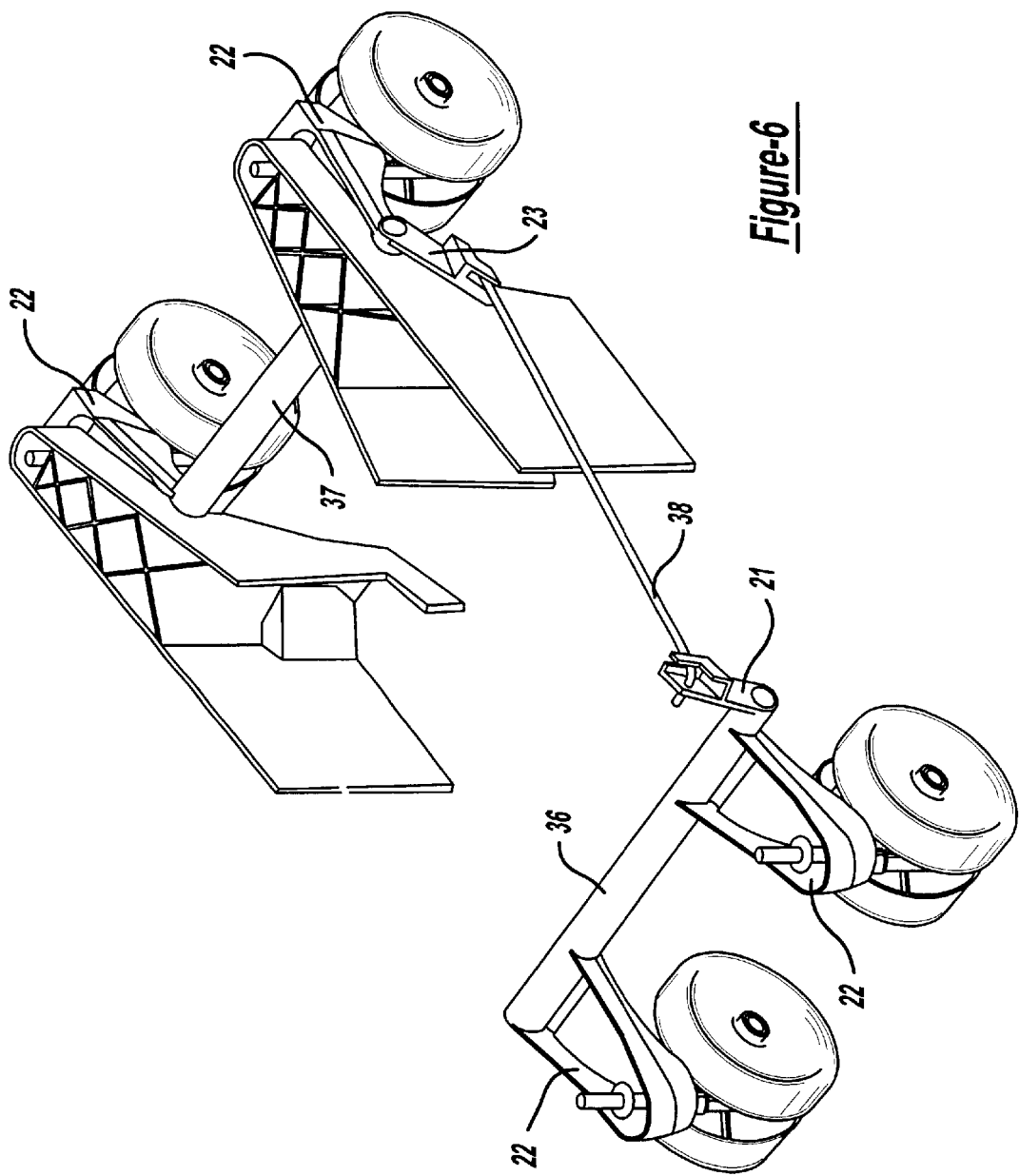
FIG. 6 shows a perspective view of the front pair of castor wheels together with corresponding pivotal levers to the ends of an interconnecting rod.

The two levers 22 which are connected to the front two castors 4 on the mower are rigidly attached in parallel to the two ends of a rod 36 perpendicularly to longitudinal axis of the rod 36 as best shown in FIG. 6. The rod 36 is mounted onto the underside of the cutting deck 2 by means of resilient clips not shown which wrap around and hold the rod 36. The clips are configured to allow the rod 36 to rotate about its longitudinal axis, thus enabling the two levers 22, attached to its ends, to pivot in unison about the longitudinal axis of the interconnecting rod 36.

The two levers 22 attached to the two rear castors 4 on the mower are similarly attached to the ends of a second rod 37 which is mounted in parallel to the first rod on the underside of the cutting deck 2 by resilient clips. Thus, the two rear levers 22 pivot in unison about the longitudinal axis of the second rod 37.

Figure 7A:
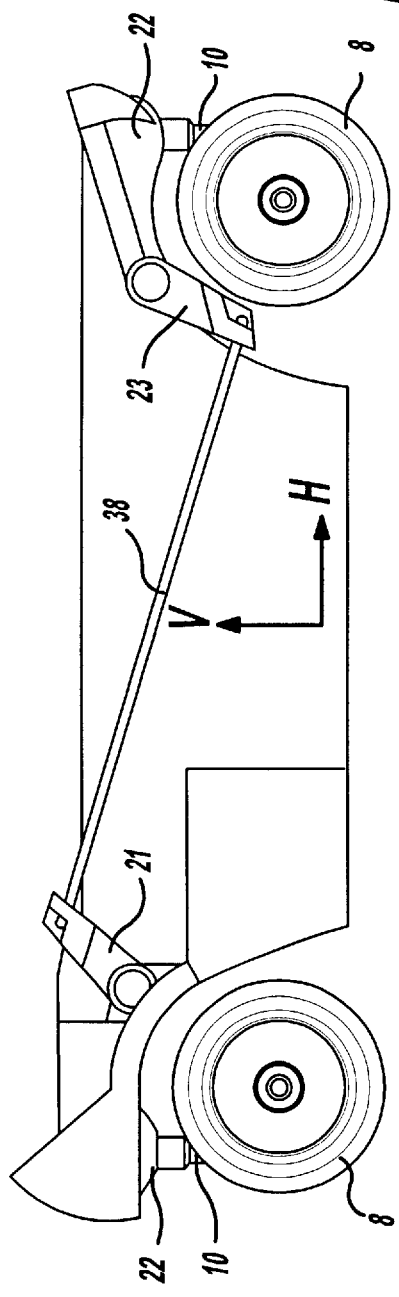
FIGS. 7A and 7B show the deck of the mower in its lowered and raised positions respectively.
Figure 7B:
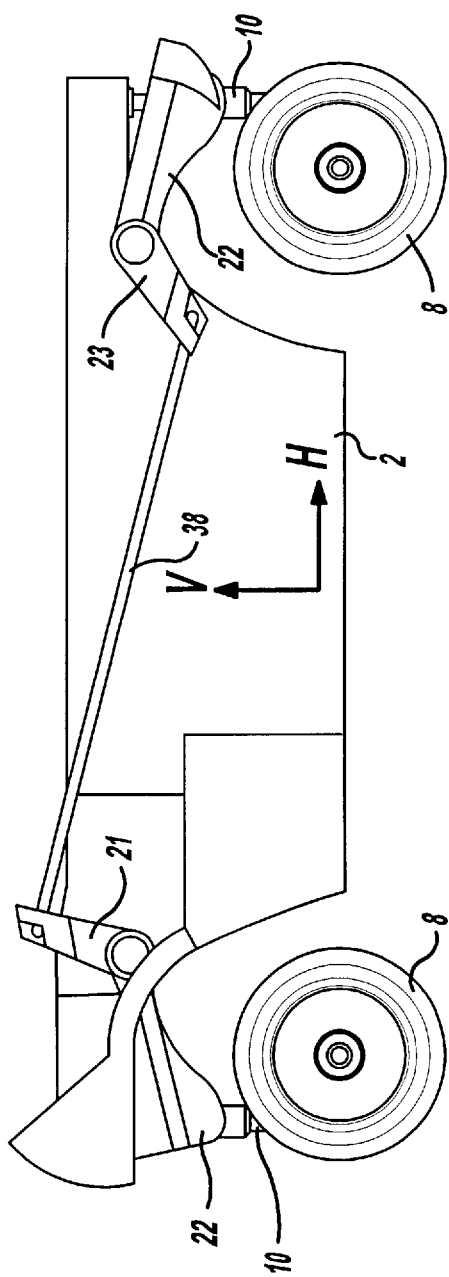

An interconnecting bar 38 is pivotally attached between a one of the front levers 22 connected to one of the front castors via a rod 21 rigidly attached to to the front lever 22 and b one of the rear levers 22 connected to one of the rear castors via a second rod 23 rigidly attached to the rear lever 22 so that all four levers 22 pivot in unison. The levers 22 attached to the front castor wheels 4 project forward in the opposite direction to the levers 22 attached to the rear castor wheels 4 which project rearward. The first rod 21 points in a general upward direction. The second points in a general downward direction. The interconnecting bar 38 pivotally attaches to the ends of the rods 21, 23 and is arranged so that clockwise rotation of the forward levers 22 results in an anti-clockwise rotation of the rear levers 22. This enables the height of the deck above all four castors to be kept constant, and that the height of the deck is adjusted in uniform manner above the four castor wheels. FIG. 7A shows the mower with the cutting deck 2 in its lowest position, FIG. 7B shows it in its highest position.

A handle 40 (not shown) preferably extends perpendicularly from one of the interconnecting rods. Pivotal movement of the handle by an operator pivots all four levers and this adjusts the height of the cutting deck and hence the cutting blade above the ground.

The height of the mower is maintained at the desired height by locking angular positions of the levers 22 by locking the angular position of the handle 40 in well known manner.

It is clear from the description that design of interconnecting bar 38 used in conjunction with the two rods 21, 23 can be utilized on a mower mounted on wheels having their axles attached to the ends of pivotal levers in a similar manner to that described in U.S. Pat. No. 4,835,952 and arranged so that the levers attached to the front axle of the front wheels pivot in the opposite direction to the levers on which the rear axle for the rear wheels is attached.

While the invention has been explained by reference to a preferred embodiment, those skilled in the art will appreciate that various modifications and variations can be made without departing from the spirit and scope of the invention. Thus the present invention is intended to cover all such modification and variations provided they are covered by the appended claims and their equivalents.

What is claimed is:

1. A lawn mower comprising:
   a cutting deck defining a generally horizontal cutting plane;
   first and second wheel assemblies mounting the deck, said first and second wheel assemblies being rotatable about a first and second rod, respectively, each rod having an axis generally perpendicular to said horizontal cutting plane;
   the first and second wheel assemblies comprising respectively first and second height adjustment mechanisms;
   the first height adjustment mechanism comprising a first pivoting mechanism pivotal about a first axis for moving said first wheel assembly axially with respect to said first rod for adjustment of the height of the deck above the first wheel assembly;
   the second height adjustment mechanism comprising a second pivoting mechanism pivotal about a second axis, parallel to the first axis, for moving said second wheel assembly axially with respect to said second rod for adjustment of the height of the deck above the second wheel assembly; and
   a connection between the first and second pivoting mechanisms for pivoting the first and second pivoting mechanisms in opposite directions about the first and second axis respectively.

2. The lawn mower of claim 1 wherein the first and second pivoting mechanisms are pivotal through a full range of movement about the first and second axis and the first and second height mechanisms raise the height of the deck approximately equal amounts when the first and second pivot mechanisms are pivoted through the full range of movement.

3. The lawn mower of claim 1 wherein the connection is a bar connected at one end to the first pivoting mechanism at a first point spaced from the first axis and connected at the other end to the second pivoting mechanism at a second point spaced from the second axis.

4. The lawn mower of claim 3 wherein the length of the bar is less than the distance between the first and second axes.

5. The lawn mower of claim 3 wherein:
   the first point is spaced from the first axis in a first direction parallel to a plane extending through the first and second axes and
   the second point is spaced from the second axis in a second direction opposite the first direction.

6. The lawn mower of claim 1 wherein the first and second rods project perpendicularly from the first and second axes, respectively.

7. The lawn mower of claim 1 wherein
   the deck extends fore and aft;
   the first and second height adjustment mechanisms are located fore and aft respectively on the deck;
   the first and second axis generally lie in and define a first plane;

a fore plane extends perpendicular to the first plane through the first axis;

an aft plane extends perpendicular through the first plane through the second axis; and the connection is located generally between the fore and aft plane.

8. The lawn mower of claim 1 wherein the first and second pivoting mechanisms comprise first and second levers, respectively, pivotally mounted on the cutting deck and connected to the first and second wheel assemblies, respectively.

9. The lawn mower of claim 8 wherein the first and second levers move as a mirror image of each other in a plane located equidistant from the first and second axis.

10. The lawn mower of claim 8 wherein:

the first lever projects from the first axis in a first direction generally parallel to a plane extending through the first and second axis and the second lever projects in second direction generally opposite to the first direction.

* * * * *